United States Patent [19]

Takayama

[11] Patent Number: 4,511,319
[45] Date of Patent: Apr. 16, 1985

[54] VENT-TYPE PLASTICATION MOLDING MACHINE

[75] Inventor: Seizo Takayama, Ube, Japan

[73] Assignee: UBE Industries, Inc., Japan

[21] Appl. No.: 409,943

[22] Filed: Aug. 20, 1982

[30] Foreign Application Priority Data

Aug. 24, 1981 [JP] Japan .............................. 56-124090[U]

[51] Int. Cl.³ ............................................. B29F 1/06
[52] U.S. Cl. .................................. 425/145; 264/40.1;
425/147; 425/203
[58] Field of Search ....................... 425/145, 147, 203;
264/40.1, 40.4, 40.7

[56] References Cited

U.S. PATENT DOCUMENTS

| | | |
|---|---|---|
| 3,360,824 | 1/1968 | Schippers . |
| 3,611,503 | 10/1971 | Blumer ................................ 425/147 |
| 3,913,796 | 10/1975 | Aoki ................................ 425/147 X |
| 4,067,554 | 1/1978 | Koch ................................ 425/145 X |
| 4,067,673 | 1/1978 | Hendry ............................. 425/147 X |

FOREIGN PATENT DOCUMENTS

| | | | |
|---|---|---|---|
| 2251769 | 5/1974 | Fed. Rep. of Germany ...... 425/145 |
| 2653925 | 6/1977 | Fed. Rep. of Germany ...... 425/145 |
| 381132 | 2/1953 | Japan . |
| 45-5560 | 3/1970 | Japan . |
| 55-16820 | 5/1980 | Japan . |
| 57-75834 | 5/1982 | Japan .................................. 425/145 |
| 2035879 | 6/1980 | United Kingdom ............... 425/145 |

Primary Examiner—Jay H. Woo
Assistant Examiner—Jill L. Fortenberry
Attorney, Agent, or Firm—McCormick, Paulding & Huber

[57] ABSTRACT

A vent-type plastication molding machine has a material supply rate control system. The reciprocal sliding motion speed of the screw in an axial direction of the heating cylinder is detected by a detector comprising a rack fixed to the reciprocally sliding portion of the machine, a pinion engaging with said rack and rotatably mounted on the stationary portion of the machine, and an electric generator connected with said pinion. The electric power supplied to the material supply means is controlled according to the voltage generated by said generator corresponding to the reciprocal sliding motion speed of the screw through a material supply rate control means comprising an amplifier, a pulse oscillator, sequence controller, a ratio setter and a TRIAC, said ratio setter setting the ratio of the maximum material supply rate to the maximum injection speed as well as the ratio of the maximum material supply rate to the maximum plastication measurement speed based on the amplified voltage signal from said amplifier, one ratio independently of the other. Thus the material is supplied always in a desirable amount so that the clogging of the vent is effectively prevented.

7 Claims, 4 Drawing Figures

VENT-TYPE PLASTICATION MOLDING MACHINE

BACKGROUND OF THE INVENTION

The invention relates to a vent-type plastication molding machine such as a vent-type injection molding machine and a vent-type extrusion molding machine and in particular to the feeding of material to such machine.

According to the prior art, a vent-type injection molding machine has a heating cylinder provided with a vent for degassing. The heating cylinder houses a screw having a first stage of a feed zone, a first compression zone, and a first metering zone, and a second stage of a deep grooved portion following the first stage, a second compression zone, and a second metering zone. Such a two-stage screw is rotatably provided in the heating cylinder so as to reciprocally slide in an axial direction of the cylinder. The material is melted under pressure with volatile gas confined therein at the first stage of the screw. The material then enters the deep grooved portion of the second stage which is either open to the atmosphere or under pressure lower than that at which the first stage is kept, resulting in inflation and foaming of the material. The molten material or resin is conveyed along the deep grooved portion of the screw, releasing gas which is discharged through the vent. In a vent-type plastication molding machine, the screw makes a reciprocal sliding motion in an axial direction with regard to the heating cylinder in addition to the intermittent motion of rotation interrupted by stillness at intervals. It is known that a vent-type extrusion molding machine suffers occasional clogging of its vent with the result that gas exhaustion is made impossible. The same is true of a vent-type injection molding machine. Clogging of the vent occasionally takes place at a standstill of the screw when the molten material inflates due to the gas therein or when the molten material located at the first stage of the screw overflows, causing gas to be generated within the material so late that the material flows into the vent before the gas breaks the resin film to escape from it. In the injection stroke, the molten material located by the vent is pushed up above the screw flight at the nozzle side of the lower end of the vent due to the relative motion of the screw with regard to the inside wall of the cylinder as the screw moves toward the nozzle. The molten material is further raised from the lower end to the upper end of the vent, sometimes flowing over the upper edge of the vent, even more so as the molten material is pushed by the following flight passing through the vent. In order to solve such problems, various shapes and forms have been proposed to be applied to the screw and the vent.

Control of the material supply rate has been another try to solve the vent clogging suffered by a conventional vent-type extrusion molding machine or vent-type injection molding machine. The Japanese Patent Publication No. 16820/1980 may be cited as one of such examples wherein the molding machine is provided with a material feeding means adapted to supply material at a constant rate so as to prevent the vent clogging. In a vent-type injection molding machine, the screw length whereby the material is melted changes as the screw retreats in its plastication stroke. This brings about the change in the melt condition of the material, the melting capability of the machine as well as degassing or foaming condition.

The result is the clogging of the vent or instable degassing process or other like gas evacuation problems which could not be solved by, for example, a plastication molding machine as disclosed in said publication which is provided with a material supply means capable of feeding material at a constant rate so as not to feed material in excess.

Conventionally, the material is not supplied to the screw in its injection stroke so that discontinuance in the supplied material is developed in the compression zone or feed zone of the first stage of the screw. Accordingly, different melt conditions of the material result from a plastication stroke wherein the discontinuance developed in the material in the feed zone of the screw is not filled up at the start of the stroke on one hand and from another plastication stroke wherein the material is filled up throughout the feed zone of the first stage on the other.

An attempt may be made to solve such problem of discontinuance developed in the supplied material due to the reciprocal sliding motions of the screw by controlling material supply so as to feed material also in the injection stroke for a certain period of time by means of a timer only to fail because the injection stroke changes as shown, and, therefore, the material still could be supplied in an amount more or less than appropriate. Another problem making proper material supply difficult, as mentioned above, is that the length in the first stage of the screw whereby the material is melted changes as the screw makes reciprocal sliding motions in an axial direction, necessarily resulting in the change of plastication ability of the machine at every moment of the plastication measurement stroke as shown in FIG. 2.

While the plastication capability of a specific screw depends on its shape, its turning speed, the temperature of the heating cylinder and the like, it is preferable to feed material consecutively in the plastication stroke as well as in the injection stroke according to the plastication capability which varies every moment. When material is fed beyond the plastication ability of the machine, the material fills up the space between the screw flights so tightly that only the outer portion of the material is melted while its inner portion is not, as it is forwardly conveyed. As a result, the temperature of the material as a whole is not raised high enough, and degassing and agitating of the material is not fully effected. Further, when material is fed excessively in the plastication stroke, material whose inner portion is not molten is pushed up to the front end of the first stage of the screw so that the material surges or rushes from the first stage into the second stage. More specifically, the first stage is vacant immediately after the material is conveyed to the second stage so material is not conveyed from the first stage to the second stage until the material in the first stage is subsequently melted and carried up to the front end of the first stage in a given amount. Once a given amount of molten material has been conveyed to the front end of the first stage, it surges or rushes into the second stage. When the surge of the material has taken place, the material in the first stage is heated in excess partially, at the front end of the first stage, for example, in case the molten material is not supplied to the second stage. As a result, more gas than usual is generated to develop the vent clogging, the material is discolored or deteriorated. On the other hand, in case material is allowed to pass the first stage quickly, part of the material is not melted enough, resulting in insufficient degassing.

Conversely, when material is supplied in too small an amount in relation to the plastication ability of the screw, the material located at the front ends of the first and second stages is allowed to remain there for a long period of time as it is not followed by a necessary amount of material so that the material is heated in excess, causing vent clogging, discoloration and deterioration of the material. Further, the material newly supplied to the first stage is conveyed forward so fast that it is not melted suffiently. Those phenomena take place in a remarkable manner with the conventional vent-type plastication molding machines. These problems can be solved by supplying material according to the plastication ability of the screw in the plastication and injection strokes so as to fill the cylinder with a fixed amount of material throughout the cylinder. Thus the temperature of the material is raised to a desirable degree, degassing is effected satisfactorily to prevent vent clogging, and good agitation of material is made possible.

SUMMARY OF THE INVENTION

It is an object of the present invention to provide a vent-type plastication molding machine capable of controlling material supply speed, whereby the speeds of advancing and retreating motions of the screw in the heating cylinder are detected to control the quantity of the material to be fed to the screw during the advancing as well as retreating motions of the screw to obtain effective degassing as well as good mixing effect, thereby preventing the clogging of the vent.

Another object of the invention is to provide a vent-type plastication molding machine comprising a material feeding means capable of feeding material at various rates, a speed detector for detecting a reciprocal sliding speed of the rotating screw, and a material feeding speed control means for controlling the feeding rate of the material in response to the speeds of the reciprocal sliding motions of the screw in an injection stroke as well as in a plastication measurement stroke.

DETAILED DESCRIPTION OF THE INVENTION

Figure 3:
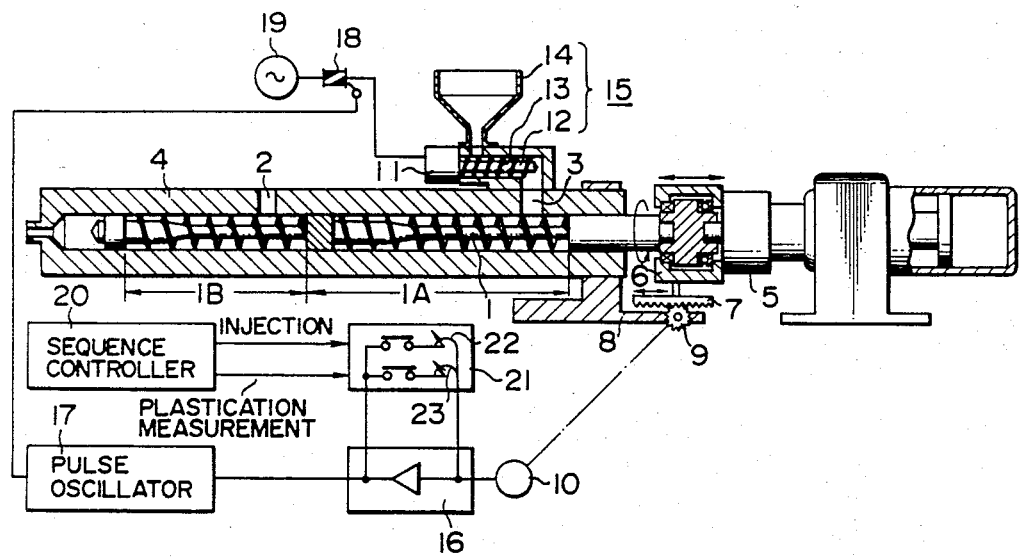

Referring to FIG. 3, a screw 1 is rotatably provided so as to slide reciprocally in an axial direction within a heating cylinder 4 provided with a vent 2 and a material supply port 3. The screw 1, driven by a hydraulic motor 5, has a first stage 1A and a second stage 1B. A rack 7 is carried by an actuating means 6 which reciprocally slides in the axial direction together with the rotating screw 1 at the times of injection as well as plastication measurement. A pinion 9 is rotatably mounted on an injection unit base 8 fixing the heating cylinder 4 so as to engage with the rack 7. The motion of the pinion 9 causes an electric generator 10 connected with the pinion 9 to generate a voltage corresponding to the moving speed of the screw 1 along its axial direction, thereby detecting the injection speed and plastication measurement speed in an injection stroke and plastication measurement stroke, respectively. The rack 7, the pinion 9 and the generator 10 are included in a speed detecting device for detecting a reciprocal sliding motion speed of the screw 1. An apparatus consisting of a magnet scale fixed onto a reciprocal motion member of the machine, a magnetic head fixed onto a stationary member, and a computer for calculating the speed or pulse signals obtained from the magnetic head may be used as another speed detector.

On the material supply port 3 in the heating cylinder 4, a material supply means 15 is provided, comprising a feed screw 12 driven by an AC speed-variable motor 11, a feeding tube 13 housing the feed screw 12 rotatably, and a hopper 14. The voltage generated by the electric generator 10 correspondingly to the moving speed of the screw 1 is amplified by an amplifier 16 and a voltage signal corresponding to the voltage amplified is applied to a pulse oscillator 17 provided to control the TRIAC phase angle. According to the TRIAC phase angle control signal transmitted from the pulse oscillator 17, the electric power to be supplied to the AC speed-variable motor 11 is controlled by the TRIAC 18 provided to control the revolution speed of the feed screw 12. An AC supply 19 is connected to the TRIAC 18.

The revolution speed of the feed screw 12 is selected and determined according to the signals transmitted from a sequence controller 20 at the injection stroke or the plastication measurement stroke, respectively, so as to change and control the respective ratios of the maximum feeding screw revolution speed to the maximum injection speed, and the maximum feeding screw revolution speed to the maximum plastication measurement speed. Those ratios are previously set individually by means of a ratio setter 21. The voltages generated by the generator 10 correspondingly to the injection speed and the plastication measurement speed are amplified through an amplifier 16 in accordance with amplification degrees given by the ratio setting members 22 and 23 of the ratio setter 21 respectively for the injection stroke and the plastication measurement stroke. The pulse oscillator 17, the TRIAC 18, the sequence controller 20 and the ratio setter 21 are included in the material supply speed control device.

In the plastication measurement stroke, the material in the first stage of the screw 1 is plasticated as the screw 1 is rotated at a predetermined speed by a torque motor or the like. The rotating screw 1 retreats as the raw material is melted and plasticated so that the length of the screw 1 whereby the raw material is melted and plasticated is shortened, thus reducing the plasticating and melting rates.

Figure 1:
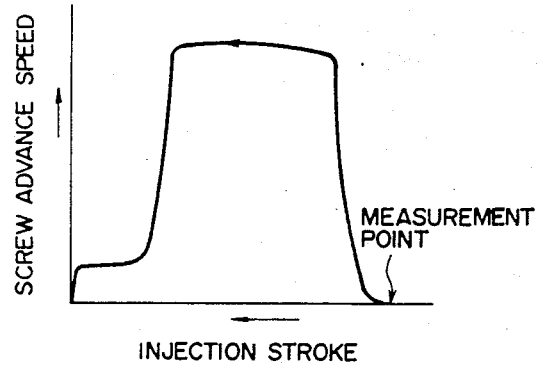
FIG. 1 is a diagram showing the relation between the injection stroke distance and the screw advancing speed.
Figure 2:
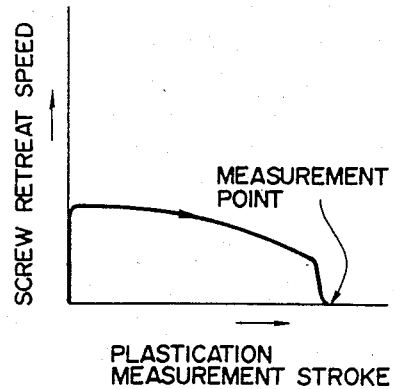
FIG. 2 is a diagram showing the relation between a plastication measurement stroke distance and the screw retreating speed, and, FIG. 3 shows a vertical section of an embodiment according to the invention.

According to the invention, the revolution speed of the feed screw 12 can be gradually decreased as shown, for example, in FIG. 2 by controlling the turning speed of the AC speed-variable motor 11 according to the retreat speed of the screw 1 which is detected by the speed detecting means including the rack 7, the pinion 9 and the electric generator 10. By changing the material supply amount from moment to moment according to the retreat speed of the screw 1 in this way, it is possible to supply material in the amount best fit to the melting speed thereof so that the material is supplied in accordance with the plasticating ability of the machine, thereby obtaining constant molten condition of the material. Thus the molten material is kept in a condition suitable for degassing as it passes under the vent 2 of the heating cylinder 4 so that the vent clogging trouble is eliminated.

According to the invention, the revolution speed of the feed screw 12 is controlled in the injection stroke as well according to the moving speed of the screw 1 in order to supply the material in a desirable amount. As a result, no discontinuance is caused in the material supply to the first stage of the screw 1 and the material is heated uniformly and at a desirable temperature so that steady and homogeneous melting of the material is easily obtained. Accordingly, not only the degassing ability of the machine is enhanced so as to effectively prevent the vent clogging but also uniform mixing of the material is made possible.

In order to obtain a desirable material supply speed, it is preferable to control the turning speed of the feed screw in the injection stroke and the plastication stroke independently since the injection motion speed is greater than the plastication measurement motion speed of the screw 1.

The above material supply means of a feed screw type may be replaced by any other feasible means, including a supply means of a rotary valve type, and a vibration type.

Figure 4:
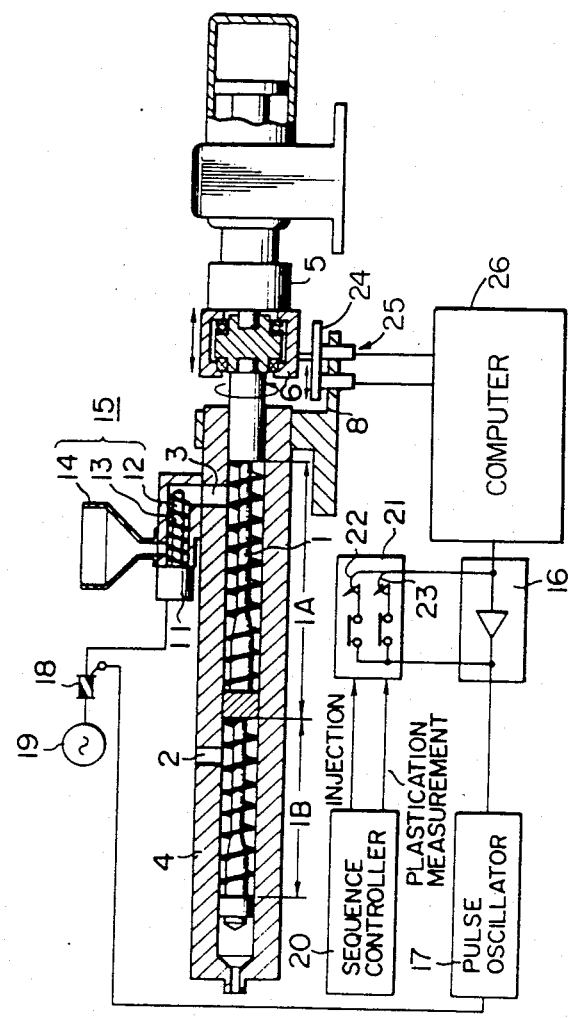
FIG. 4 is similar to FIG. 3 but illustrates another embodiment of the invention.

Further, the speed detector for detecting the reciprocal sliding motion speed of the screw 1 comprising the rack 7, the pinion 9 and the electric generator 10 as mentioned above may be replaced by another detecting means including those of electromagnet type and magnet scale type. Such a speed detector is illustrated in FIG. 4 wherein the speed detecting means for detecting the reciprocal sliding speed of an injection screw 1 includes a magnetic scale 24 fixed to the recriprocal sliding portion of the illustrated molding machine, a magnet head, indicated generally at 25, fixed to the stationary portion of the machine, and a computer, indicated generally at 26, for calculating a reciprocal sliding motion speed of the injection screw 1 by using pulse signals fed from the magnetic head 25.

According to the invention, the turning speed of the feed screw 12 is controlled in accordance with the reciprocal motion speed of the screw 1 in the injection stroke as well as the plastication measurement stroke irrespective of the revolution speed of the screw 1 so that the material supply amount, i.e., the material supply rate is controlled so as to have a preferable amount of material filled in the cylinder all the time. Thus the material is heated uniformly, maintained at a high temperature and a preferable plastication of the material is made possible. Consequently, the degassing and mixing ability of the machine is greatly enhanced and, as a result, the vent clogging is effectively prevented, making it possible to easily obtain mold products of excellent quality.

I claim:

1. A vent-type plastication molding machine comprising a material supply means provided at a material supply port communicating with a base end of an injection screw to feed material at various rates, a speed detecting means for detecting a reciprocal sliding speed of said screw, and a material supply speed control means for changing or controlling the material supply speed of said material supply means so as to correspond to the reciprocal sliding speed of the injection screw at an injection stroke and a plastication measurement stroke.

2. A vent-type plastication molding machine according to claim 1, wherein said material feeding speed control comprises means for adjusting the ratio of the material supply speed to the material injection speed, and the ratio of the material supply speed to the plastication measurement speed at the injection stroke and the plastication measurement stroke, independently.

3. A vent-type plastication molding machine according to claim 1 or 2, wherein said speed detecting means for detecting the reciprocal sliding speed of said injection screw includes a rack fixed to a driven portion reciprocally sliding along an axial direction of the injection screw together with the injection screw in the injection stroke and the plastication measurement stroke, a pinion engaging with said rack and rotatably fixed to an injection unit base having a heating cylinder fixed thereto and an electric generator connected to said pinion to generate a voltage corresponding to the axial sliding motion speed of said injection screw.

4. A vent-type plastication molding machine according to claim 1 or 2, wherein said speed detecting means for detecting the reciprocal sliding speed of said injection screw includes a magnetic scale fixed to the reciprocally sliding portion, a magnet head fixed to the stationary portion, and a computer calculating a reciprocal sliding motion speed of said injection screw by using pulse signals fed from said magnet head.

5. A vent-type plastication molding machine according to claim 1 or 2, wherein said material supply speed control means includes an amplifier for amplifying the voltage generated by said electric generator, a ratio setting means provided with a first ratio setting member for setting the ratio of the maximum supply speed to the maximum injection speed in the injection stroke and a second ratio setting member for setting the ratio of the maximum supply speed to the maximum plastication measurement speed at the plastication measurement stroke, a sequence controller for instructing the respective ratio setting members of said ratio setting means in the injection stroke and the plastication measurement stroke, a pulse oscillator for receiving a voltage signal and controlling a TRIAC phase angle, and said TRIAC for controlling the electric power supplied to said material feeding means based on the signals fed from said pulse oscillator.

6. A vent-type plastication molding machine according to claim 3, wherein said material supply speed control means includes an amplifier for amplifying the voltage generated by said electric generator, a ratio setting means provided with a first ratio setting member for setting the ratio of the maximum supply speed to the maximum injection speed in the injection stroke and a second ratio setting member for setting the ratio of the maximum supply speed to the maximum plastication measurement speed at the plastication measurement stroke, a sequence controller for instructing the respective ratio setting members of said ratio setting means in the injection stroke and the plastication measurement stroke, a pulse oscillator for receiving a voltage signal and controlling a TRIAC phase angle, and said TRIAC for controlling the electric power supplied to said material supply means based on the signals fed from said pulse oscillator.

7. A vent-type plastication molding machine according to claim 4, wherein said material supply speed control means includes an amplifier for amplifying the voltage generated by said electric generator, a ratio setting means provided with a first ratio setting member for setting the ratio of the maximum supply speed to the maximum injection speed in the injection stroke and a second ratio setting member for setting the ratio of the maximum supply speed to the maximum plastication measurement speed at the plastication measurement stroke, a sequence controller for instructing the respective ratio setting members of said ratio setting means in the injection stroke and the plastication measurement stroke, a pulse oscillator for receiving a voltage signal and controlling a TRIAC phase angle, and said TRIAC for controlling the electric power supplied to said material feeding means based on the signals fed from said pulse oscillator.

* * * * *